United States Patent
Bose (10) Patent No.: US 9,986,577 B2
(45) Date of Patent: May 29, 2018

(54) SPECTRUM ACCESS SYSTEM

(71) Applicant: Vanu, Inc., Cambridge, MA (US)

(72) Inventor: Vanu Bose, Boston, MA (US)

(73) Assignee: Vanu, Inc., Lexington, MA (US)

( * ) Notice: Subject to any disclaimer, the term of this patent is extended or adjusted under 35 U.S.C. 154(b) by 0 days. days.

(21) Appl. No.: 14/184,694

(22) Filed: Feb. 19, 2014

(65) Prior Publication Data

US 2014/0237547 A1   Aug. 21, 2014

Related U.S. Application Data (60) Provisional application No. 61/766,507, filed on Feb. 19, 2013.

(51) Int. Cl.
| | | |
|---|---|---|
| *H04W 72/10* | (2009.01) | |
| *H04W 52/34* | (2009.01) | |
| *H04W 12/08* | (2009.01) | |
| *H04W 72/08* | (2009.01) | |
| *H04W 72/04* | (2009.01) | |
| *H04L 12/24* | (2006.01) | |
| *H04W 16/14* | (2009.01) | |
| *H04W 52/36* | (2009.01) | |

(52) U.S. Cl.
CPC ........ *H04W 72/10* (2013.01); *H04L 41/0896* (2013.01); *H04W 12/08* (2013.01); *H04W 16/14* (2013.01); *H04W 52/34* (2013.01); *H04W 52/346* (2013.01); *H04W 52/367* (2013.01); *H04W 72/0453* (2013.01); *H04W 72/0486* (2013.01); *H04W 72/082* (2013.01); *H04W 52/343* (2013.01); *H04W 72/04* (2013.01)

(58) Field of Classification Search
CPC .. H04L 41/0896; H04W 12/08; H04W 16/10; H04W 28/16; H04W 28/18; H04W 28/20; H04W 52/34; H04W 52/343; H04W 52/346; H04W 52/367; H04W 72/04; H04W 72/0453; H04W 72/0486; H04W 72/0493; H04W 72/082; H04W 72/10
See application file for complete search history.

(56) References Cited

U.S. PATENT DOCUMENTS

| | | |
|---|---|---|
| 7,146,176 B2 | 12/2006 | McHenry |
| 7,409,010 B2 | 8/2008 | McHenry |
| 7,564,816 B2 | 7/2009 | McHenry et al. |
| 8,027,249 B2 | 9/2011 | McHenry et al. |

(Continued)

OTHER PUBLICATIONS

Amendment of the Commission's Rules with Regard to Commercial Operations in the 3550-3650 MHz Band, Notice of Proposed Rulemaking, 27 FCC Rcd 15594 (Dec. 12, 2012).*

(Continued)

*Primary Examiner* — Theodore C Parsons
(74) *Attorney, Agent, or Firm* — Fish & Richardson P.C.

(57) ABSTRACT

A method for dynamically managing spectrum access and supporting multiple tiers of users is provided. A spectrum access server receives a request from a device to access a segment of spectrum, and determines which tier of the multiple tiers is associated with the request. If the request is from a second tier user and the request does not interfere with first tier users, the request is granted. If the request is from a third tier user and the request does not interfere with first tier users and authorized second tier users, the request is granted.

22 Claims, 3 Drawing Sheets

(56) References Cited

U.S. PATENT DOCUMENTS

| | | | |
|---|---|---|---|
| 8,055,204 B2 | 11/2011 | Livsics et al. | |
| 8,064,840 B2 | 11/2011 | McHenry et al. | |
| RE43,066 E | 1/2012 | McHenry | |
| 2004/0148505 A1* | 7/2004 | Qiu | G06F 21/33 713/175 |
| 2008/0102848 A1* | 5/2008 | Jung | H04L 5/0087 455/450 |
| 2010/0081449 A1* | 4/2010 | Chaudhri | H04W 72/082 455/452.2 |
| 2010/0177663 A1* | 7/2010 | Johansson | H04W 4/00 370/254 |
| 2011/0055070 A1* | 3/2011 | Stanforth | G06Q 10/063 705/37 |
| 2014/0106801 A1* | 4/2014 | Tamizhmani | H04W 24/02 455/501 |
| 2015/0005022 A1* | 1/2015 | El-Refaey | H04W 16/14 455/509 |
| 2015/0036509 A1* | 2/2015 | Lopes | H04W 16/10 370/241.1 |
| 2015/0111591 A1* | 4/2015 | Hoffberg | G06Q 10/0631 455/452.1 |

OTHER PUBLICATIONS

President's Council of Advisors on Science and Technology, Report to the President: Realizing the Full Potential of Government-Held Spectrum to Spur Economic Growth, http://www.whitehouse.gov/sites/default/files/microsites/ostp/pcast_spectrum_report_final_july_20_2012.pdf (Jul. 20, 2012).*

V. Asghari and S. Aissa, "Resource Management in Spectrum-Sharing Cognitive Radio Broadcast Channels: Adaptive Time and Power Allocation," in IEEE Transactions on Communications, vol. 59, No. 5, pp. 1446-1457 (IEEE May 2011).*

"Standards for Dynamic Spectrum Access Networks," SCC41. IEEE, Aug. 2008, pp. 1-24.

Shared Spectrum Company, "http://www.sharedspectrum.com/2012/01/shared-spectrum-company-awarded-patents-for-key-dynamic-spectrum-access-technologies", pp. 1-2, Jan. 31, 2012.

Google—Spectrum Database, "https://www.google.com/get/spectrumdatabase", p. 1, downloaded Dec. 9, 2015.

Qualcomm, Authorized Shared Access (ASA), "http://www.qualcomm.com/invention/research/projects/lte-advanced/asa", pp. 1-3, downloaded Dec. 9, 2015.

"Report to the President, Realizing the Full Potential of Government-Held Spectrum to Spur Economic Growth," "http://m.whitehouse.gov/sites/default/files/microsites/ostp/pcast_spectrum_report_final_july_20_2012.pdf", Jul. 2012, pp. 1-188.

Next Generation Communications Poster, "http://web.archive.org/web/20081205133313/http://www.darpa.mil/sto/images/posters/thumbs/XGen-thumb.jpg", Mar. 16, 2010, p. 1.

Dr. Larry Stotts, "The Next Generation Program," "http://web.archive.org/web/20100316162019/http://www.darpa.mil/sto/smallunitops/xg.html", Mar. 16, 2010, pp. 1-2.

* cited by examiner

SPECTRUM ACCESS SYSTEM

CROSS-REFERENCE TO RELATED APPLICATIONS

This application claims priority to U.S. provisional application 61/766,507, filed on Feb. 19, 2013. The contents of the above application are incorporated herein by reference in their entirety.

TECHNICAL FIELD

This disclosure generally relates to spectrum access systems.

BACKGROUND

The Federal Communications Commission (FCC) regulates the use of radio frequency bands of the electromagnetic spectrum by a spectrum management process called frequency allocation. The FCC's Table of Frequency Allocations consists of the International Table of Frequency Allocations and the United States Table of Frequency Allocations. The FCC is also responsible for managing and licensing the electromagnetic spectrum for commercial users and for non-commercial users including: state, county and local governments. This includes public safety, commercial and non-commercial fixed and mobile wireless services, broadcast television and radio, satellite and other services.

Government agencies may have been granted use of certain spectrum. One method for obtaining the spectrum for commercial use is to move the incumbent government users out of the spectrum (perhaps to a different frequency band) and then license the spectrum for commercial use.

SUMMARY

In general, in one aspect, a method for dynamically managing spectrum access and supporting multiple tiers of users is provided. The method includes: at a spectrum access server, receiving a request from a device to access a segment of spectrum; determining which tier of the multiple tiers is associated with the request; if the request is from a second tier user and the request does not interfere with first tier users, granting the request; and if the request is from a third tier user and the request does not interfere with first tier users and authorized second tier users, granting the request.

In general, in another aspect, a method for dynamic spectrum access is provided. The method includes at a spectrum access server, receiving a request from a first device to access a segment of spectrum; initially granting the first device access to the segment of spectrum at a first maximum allowable power level; receiving information about spectrum usage local to the first device; and dynamically adjusting the maximum allowable power level for the first device based on the information about spectrum usage local to the first device.

In general, in another aspect, a system for dynamically managing spectrum access and supporting multiple tiers of users is provided. The system includes a first database storing information on spectrum usage of first tier users; a second database storing information on spectrum usage of second tier users; and a spectrum analytic engine to make dynamic spectrum allocation decisions based on the information in the first and second databases. The spectrum analytic engine is configured to, upon receiving a request from a device to access a segment of spectrum, determine which tier of the multiple tiers is associated with the request, and if the request is from a second tier user and the request does not interfere with first tier users, grant the request. If the request is from a third tier user and the request does not interfere with first tier users and authorized second tier users, grant the request.

The details of one or more implementations of spectrum access systems are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Overview of Spectrum Access System

This disclosure describes a novel spectrum access system for allowing dynamic access of spectrum by various entities to efficiently use wireless spectrum. The system supports leaving the incumbent users in place while also enabling new entrants to use the spectrum. The spectrum access system combines database information on spectrum availability with sensing technology in which devices sense the surrounding spectrum to provide information about real time local spectrum usage. By combining timely local information with global database information on spectrum usage, the spectrum access system can support a more efficient, dynamic wireless communication system.

An advantage of the spectrum access system is that it enables incumbent spectrum users to stay in place, while other entities use the same spectrum dynamically as allowed. This enables tremendous amounts of spectrum to be used efficiently by eliminating the time consuming and costly step of relocating incumbent users to a new band before new operations can begin in the band.

For example, the spectrum access system can be used to manage the use of the 3550-3650 MHz band, but is not limited to this frequency band.

In some implementations, the spectrum access system supports three tiers of users. Tier 1 users are the incumbent users, e.g., federal government agencies, such as military agencies or emergency management agencies. Tier 2 users can be, e.g., priority access users who have licenses for spectrum use as secondary users. Tier 3 users can be, e.g., generally authorized access (GAA) uses who do not have dedicated licenses and request spectrum usage from time to time on a need basis. The tier 1 government agency users may have been granted exclusive use of a segment of spectrum, but uses the segment of spectrum only in certain geographical regions at certain times. The tier 2 and tier 3 users can be new entrant commercial users who wish to use the same segment of spectrum when not in use by the incumbent government agencies.

By allowing the federal incumbent users in place, the spectrum access system allows freeing up a significant amount of spectrum rapidly by avoiding the time and cost associated with the conventional spectrum clearing approach. Furthermore, the three-tier model brings the benefits of the dedicated licensed model and the unlicensed model to the market place for the benefit of consumers.

In some examples, the tier 1 incumbents have a guaranteed access to the spectrum and the highest priority, the tier 2 users can operate within limitations under the tier 1 users, and the tier 3 users can share the spectrum as long as it does not cause unacceptable interference to the tier 1 and tier 2 users.

In this description, depending on context, the term "user" may refer to a device. For example, in a spectrum access system that has multiple devices communicating with a spectrum access manager, the term "user" can refer to, e.g., base stations, mobile phones, personal computers, etc.

The spectrum access system is an active and dynamic system. The spectrum access system handles issues related to access control, dynamic device management, and protection of sensitive Department of Defense data. The spectrum access system places some requirements on the end user devices, in particular related to certificate management and authentication. The spectrum access system is responsible for implementing protocols and automated procedures for dynamic access to spectrum.

Figure 1:
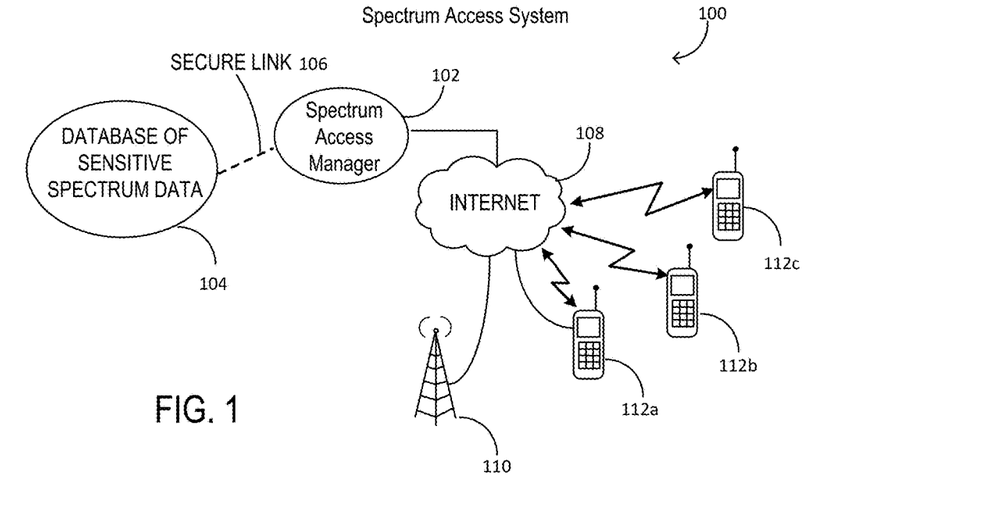
FIG. 1 is a diagram of an exemplary spectrum access system.

Referring to FIG. 1, in some implementations, a spectrum access system 100 manages shared spectrum and enables commercial users to share the spectrum with the incumbents. The spectrum access system 100 includes a spectrum access manager 102 and secure trusted agents on devices that use the shared spectrum. The spectrum access manager 102 includes one or more databases that have information about global usage of the spectrum. The spectrum access manager can be implemented as a database or big data analytics system. The devices that use the shared spectrum can include, e.g., infrastructure devices 110 (e.g., base stations and WiFi access points), wireless client devices 112a to 112c (e.g., mobile phones, or personal computers such as desktop, notebook, or tablet computers), machine-to-machine (M2M) system, and point-to-point communications systems.

For example, the one or more databases in the spectrum access manager 102 can include TV whitespace databases operated by Microsoft, Google, and other entities.

In some examples, the spectrum access system 100 includes a secure database 104 for storing sensitive spectrum usage data. The spectrum access manager 102 accesses the database through a secure link 106. By using a separate database 104, access to the sensitive spectrum usage data can be limited. For example, the Department of Defense may limit access to data regarding the location and times of operation of certain systems. The spectrum access manager 102 can query the Department of Defense database through a secure channel when there are requests for specific locations and frequencies. The Department of Defense database can respond with the specific information for the relevant access request, without making all of the data accessible to the public all of the time. Furthermore, the Department of Defense can limit access if it suspects the spectrum access systems may have been compromised. This approach provides a good balance between Department of Defense's concern at releasing a large amount of sensitive information to a variety of public and private institutions and the need to access specific information to enable spectrum sharing when there are actual systems that need access to the spectrum.

The devices communicate with the spectrum access manager 102 through a network, such as the Internet 108. When a device needs access to spectrum, the device sends a request to the spectrum access manager 102, and the spectrum access manager 102 determines whether to grant access based on global spectrum usage information in the database 104 and local spectrum usage information provided by devices and sensors. The request can include information such as location, frequency bands the device can utilize, requested bandwidth, desired timeframe for operation, antenna type, antenna height above ground, and/or desired output power.

These devices that use the shared spectrum each has a security and authentication mechanism, such as a certificate based module, to communicate securely with the spectrum access manager 102. The spectrum access manager 102 issues an authorization to each of the devices to use a certain amount of spectrum at a certain place for a certain amount of time. An example of such an authorization is a certificate. The certificate has a time limitation (referred to as "time-to-live" or TTL) that can be used as a mechanism to revoke device permissions by not renewing the authority. Device permission may fail to be renewed for many reasons, including (i) spectrum access was requested by a higher priority user, or (ii) the device has been determined to be faulty, and no further usage authority will be granted until the flaw is verifiably fixed.

For example, the spectrum access system 100 can enable different licensing regimes to coexist simultaneously, such as allowing license-by-rule for indoor use and other types of licenses for outdoor use.

The spectrum access manager 102 allows the incumbent spectrum users to continue using the spectrum and allows one or more tiers of commercial users with different access rights and priorities. There is no limit to the number of different tiers that can be supported. The following describes as an example a three-tiered system that allows for the incumbents, priority access users, and generally authorized users (which is similar to conventional unlicensed devices).

The spectrum access manager 102 has information regarding incumbent spectrum use and recent measurements for devices and sensors that the spectrum access manager 102 has access to. The spectrum access manager 102 receives requests from devices for spectrum and makes allocation decisions based on all of the available information.

The spectrum access manager 102 enables wireless devices to gain access to shared spectrum as they need it. The device that wishes to gain access to shared spectrum first contacts the spectrum access manager 102. This can be done through an existing wireless connection, such as WiFi or cellular connection, or through a wired connection. The initial authorization of a device may occur through a wired connection, such as connecting the device to a universal serial bus (USB) port on an Internet-connected computer. Once the device has access to shared spectrum, future contact with the spectrum access manager 102 can be through this shared spectrum connection, for as long as that connection is authorized.

The device sends an access request to the spectrum access manager 102, in which the request includes information that allows the spectrum access manager 102 to authenticate the device. The request includes information regarding the device's location, frequency bands and bandwidths that the device is capable of using, and the desired duration for which the spectrum is requested. Based on the information that the spectrum access manager 102 has regarding incumbent users, other authorized commercial users, and any sensing information in the local area that the device is requesting access, the spectrum access manager responds with a secure authorization, for example a certificate, which allows the device to utilize a certain spectrum band, or bands, in a geographic region for a specified period of time. The certificate may also specify the allowed bandwidth, transmit power limit, and an out-of-band emissions mask requirement.

The time frame authorized may or may not correspond to the requested time frame. The time frame, expressed as a time-to-live (TTL), serves multiple purposes. The device can make another request as the time-to-live time is about to expire, to continue operation. In addition to allowing the device to operate, the time-to-live parameter also sets an upper bound on how long it would take to shut down the shared users in given areas if needed, for example, if the spectrum is needed by first responders in an emergency. The time-to-live parameter provides a mechanism to shut down faulty devices. If a manufacturing error is detected in a device, then future authorizations of that device type can be denied until the flaw is remedied, and the time-to-live parameter sets an upper bound on how long until all such devices are shut down.

There are several reasons why the spectrum access manager 102 may deny an access request. A request may be denied, e.g., when there is a flaw in the device or when the user is inside an exclusion zone where the requested frequencies are not available. The request may also be denied when there are too many devices already in operation in that region for that spectrum, and the aggregate emissions from these devices would cause interference to the incumbent users if an additional device were allowed to start operation.

The spectrum access system 100 allows for new licensing regimes that are not possible without dynamic management of the spectrum. Dynamic device management can be made more effective by using sensing data in the device management algorithms. By incorporating sensing technology that is already utilized in cellular and WiFi networks, the spectrum access system 100 can manage spectrum very effectively. Currently, many devices perform some sort of spectrum sensing. For example, many cellular phones periodically provide measurement reports back to the network operator, the reports containing the identities and strengths of the cell towers within range of the phone. Many femtocell devices have downlink scanning capability built in, and many WiFi access points have scanning capability, which is the mechanism that the WiFi access points use to find a channel to operate on. Requiring devices in this band to periodically sense the spectrum and report that data back to the spectrum access system 100 will likely not increase device cost because this capability already exists in the device and is already used for effective network and spectrum management in conventional networks (e.g., cellular networks). The sensing data provides timely local information. The spectrum access system 100 has global information beyond what any particular device is able to sense. The combination of global and local spectrum usage information enables an efficient spectrum management scheme. The reporting of sensing data can be implemented using the reporting mechanism already existent in conventional cellular networks, or incorporate newer technologies such as those being developed in Defense Advanced Research Projects Agency's (DARPA's) Advanced RF Mapping program.

The devices determine their locations using, e.g., global positioning system (GPS) or other position locations technology. The location sensing may not be very accurate, e.g., when the device is operating indoors. A "trust but verify" approach can be used for determining the locations of devices operating indoors or in other areas where precise position information is not easily available. The "trust" portion of the approach can be implemented using a method similar to what has been employed for E911 calls over voice-over-Internet-protocol (VoIP) services. In this approach, the spectrum access manager 102 initially relies upon the user or service provider to provide a location where the device is operating. The spectrum access manager 102 then uses available sensing data to "verify" this information. The approximate location can be verified using the measurement reports coming to the spectrum access manager from the devices in operation. If the reports show signal energy from a device in an area that is far away from the listed location, then the spectrum access manager 102 can revoke the device permissions since it can positively determine that the device is not in the location listed. The primary mechanism for this data can be, e.g., outdoor devices that have GPS capability, in which the measurement report includes both a known position and signal strength. Once devices are verified as being in the listed locations, their sensing data can be used to verify other devices in the vicinity.

Spectrum Access Control

Access control is an important function of the spectrum access system 100. Devices need to contact the spectrum access manager 102 for permission to use the spectrum. In order to properly implement access control, a certificate mechanism is supported by the devices. When permission is granted to a device, the permission is associated with a time-to-live (TTL) parameter, requiring the device to re-authenticate within the time-to-live period. This provides a mechanism to effectively revoke permissions from devices found to be operating out of specified parameters and also provides a way of temporarily "clearing spectrum" by not renewing certificates in the case of an event that might invoke priority rights for mission critical users. The appropriate value for the time-to-live is likely to vary with time and location, and can be set by the operator of the spectrum access system in consultation with the federal incumbent users to balance the need between quickly clearing malfunctioning devices and not overwhelming the spectrum access system 100 with frequent renewal requests.

Permission for a device to operate may be denied by the spectrum access manager 102 for any number of reasons, including: the device is inside of an exclusion zone, the device has been determined to have a flaw and cannot be authorized (or re-authorized) until it is fixed by the manufacturer; or there are too many devices in operation in a particular area which may lead to harmful interference to the incumbent. By denying permission when there are too many devices in operation, use of the spectrum by the incumbent can be protected. For example, in the WiFi bands, there is a concern that too many users may enter into a given area and raise the interference floor to a level where none of the devices can use the spectrum. In general this has not happened in the WiFi bands primarily because there is a shared interest on everyone's part to make the spectrum useful. Individuals become their own band managers and make decisions to purchase devices such as phone and a wireless network hub that operate in different bands. In addition, technology advances such multiple-input-multiple-output (MIMO) have improved the robustness to interference of WiFi routers, allowing many more to coexist in the same space. Future technology advances may further improve the interference tolerance of these systems. This approach does not work for incumbent spectrum users. Technology advances and individual management techniques may allow generally authorized access devices to be able to operate in increasing levels of interference over time, but the incumbent systems, such as radars, are upgraded on a much longer time cycle and will likely not improve their robustness to interference at the same rate. Without access control, more and more generally authorized access devices can be introduced into the band, and they may work quite well, just as most WiFi devices do today. However, the aggregate interference created by the devices may generate crippling interference to the incumbent. The access control mechanism in the spectrum access manager 102 is designed to avoid this outcome.

The access control mechanism can be used to generate different zones of operation, rather than just the exclusion zone and one zone of operation. One of the incumbent concerns is that consumer devices may be interfered with or possibly even damaged by some of the high power systems used by the incumbents. The spectrum access system 100 can define multiples zones of operation in which different classes of devices can operate. For example, the default authorization for all devices can be the existing 200 mile exclusion zone. Devices that have been certified for operation with higher tolerances to incumbent signals can be authorized to operate in zones closer to the incumbent systems. For example, a series of concentric circles around the incumbent zone of operation can be used to define different access zones. The zones a device can be authorized for depend upon the certification criteria the device has achieved. The device certification qualifies the robustness to interference of the receiver as well as the survivability of the device under certain types of extreme high power signals. This does not have to be a heavyweight or rigorous certification process, and can be a self-certification process. The self-certification process is simple and imposes a low cost on the device manufacturer. Because the spectrum access manager 102 has the ability to revoke permissions for devices that are found to not meet the stated criteria, the risk incurred through a self-certification process is low.

Dynamic Device Management

The spectrum access manager is involved in dynamically managing the device permissions. Unlike TV whitespaces, where the incumbent television stations are stationary and new stations come on and off line on a timescale of years, the spectrum landscape in the band for new wireless devices changes on a much more rapid time scale.

The permissions provided by the spectrum access manager 102 specifies the frequencies and power levels that the device is allowed to operate at, in addition to area of operation and time-to-live. The appropriate power levels for the various tiers of operation can vary depending on the environment. The spectrum access manager 102 determines the appropriate power levels dynamically so that the power level does not have to be a fixed level for all places and all times. For example, in rural areas devices can be allowed to operate at higher power levels if the device density in the area is low. If more devices are added over time, when the devices operating at the higher power level attempt to renew their certificates, their allowable power levels can be lowered. This maximizes spectrum utilization based upon requested usage. This improves over the conventional static rules in which all devices have to abide by the same power level, even if there are relatively few in operation in a given area, which is a waste of spectrum resources. A dynamic approach allows the spectrum usages to be maximized for the number of devices desiring to use the spectrum in a given time period, and to adapt that usage over time to best utilize the spectrum as the number of devices requesting permission changes. If necessary to be consistent with the license-by-rule framework, a low power (e.g., 100 mW) can be the default power level for the generally authorized access devices. This limit can then be raised based on coordination with the spectrum access manager 102 on a case by case basis.

Dynamic management combined with sensing provides a solution to the boundary problem in the hybrid model in which geographic area licenses are issued for public property or outdoor areas, while a license-by-rule approach is employed in private property or indoor areas. The spectrum access manager 102 sets an appropriate power level for the license-by-rule users in which different users may be allowed different power levels. The appropriate power level for an indoor user in a densely populated apartment building is different from that of a user on a corporate campus or rural area. Dynamic management combined with sensing data allows better management of the appropriate power levels. Initially, the device can be authorized with a power level based on the other requested use in the geographic area. The default can be a low power limit suitable for indoor urban settings, but if the device is in another region or in an area where few systems are in use, the initial power limit can be raised. As sensing data comes in from devices in the area, the power level can be adjusted dynamically. For example, if there are priority access devices in the area, and they report seeing significant outdoor power levels from a tier 3 generally authorized access device, the spectrum access manager 102 can adjust the power limit of the generally authorized access device downwards. This can be achieved in one of two ways. If the generally authorized access device is connected to the network, the spectrum access manager 102 can send a message to the device to adjust the allowable power level. If the device is not connected to the network, then the power level is adjusted when the device's time-to-live expires and the device contacts the spectrum access manager 102 for a new certificate. The timeframe required for such adjustments are a factor that should be considered when initially setting the length of the device's time-to-live parameter. Once the device has been in operation for a while, and the power levels seem suitable, the time-to-live can be increased when the next certificate is issued to the device.

Dynamic device management through the spectrum access system 100 can maximize spectrum utilization as the spectrum landscape changes over time and provides an effective mechanism to manage the boundary problem in the hybrid model in which geographic area licenses are issued for public property or outdoor areas, while a license-by-rule approach is employed in private property or indoor areas.

Device Requirements

In order for the spectrum access system 100 to function properly, the spectrum access manager 102 needs to trust that the devices operating in the band will operate within the limits placed on them by the spectrum access manager 102. First, the spectrum access manager 102 authenticates the device and establishes a secure communications channel with the device. Second, the device is configured to operate with the limits specified by the spectrum access manager 102, in which the spectrum access manager 102 may change the limits based on time and location.

Figure 2:
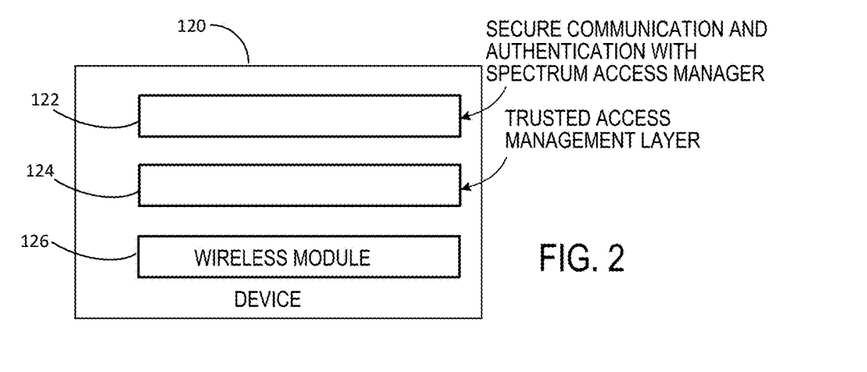
FIG. 2 is a diagram of various layers of the spectrum access system.

Referring to FIG. 2, each device (e.g., 110 and 112a to 112c) that accesses the shared spectrum has an authentication mechanism and a resource control mechanism that only allows access to certain frequencies if authentication has been granted for that spectrum at that place and at that time by the spectrum access manager 102. In some implementations, a device 120 includes a layer 122 for secure communication and authentication with the spectrum access manager 102, and a layer 124 for trusted access management. The layer 124 is responsible for enforcing the limits of operation in terms of frequency, bandwidth, power, time and out of band emissions that are specified by the certificates issues by the spectrum access system 100. Verification of layer 124's ability to properly enforce these limits is a critical component of the device certification. The device 120 includes a wireless module 126, which is the component that performs the typical communication functions, such as data encoding and decoding, signal modulation, power management, according to communications protocols.

Technical solutions for authentication and establishing a secure channel exist today in systems and standards such as X.509. See Internet X.509 Public Key Infrastructure Certificate and CRL Profile, RFC 2459, http://www.ietf.org/rfc/rfc2459.txt. These are used in a wide range of wireless systems today ranging from WiMAX radios to Android devices and some software defined radio-based amateur radio systems. The technology for authenticating and securely communicating with a device is mature, cost effective and available today.

Insuring the radio operates within the limits specified by the spectrum access manager 102 is verified as part of the device approval process. The information provided by the spectrum access manager 102 includes allowable power levels, frequency ranges, geographic areas and a time-to-live parameter. The device has a secure mechanism that does not allow the radio to operate out of bounds in any of these dimensions. The device is designed with a mechanism to limit operation in each of the parameters specified by the spectrum access manager 102, which can be implemented in the device's firmware and tested and verified. A light weight self-certification process can be adopted for devices, such as self-verification or a declaration of conformity so as not to increase time to markets or place a significant cost burden on the device manufacturer. The spectrum access manager 102 can revoke device operating permission if an issue is discovered, mitigating the need for a more formal certification process involving third parties.

Figure 3:
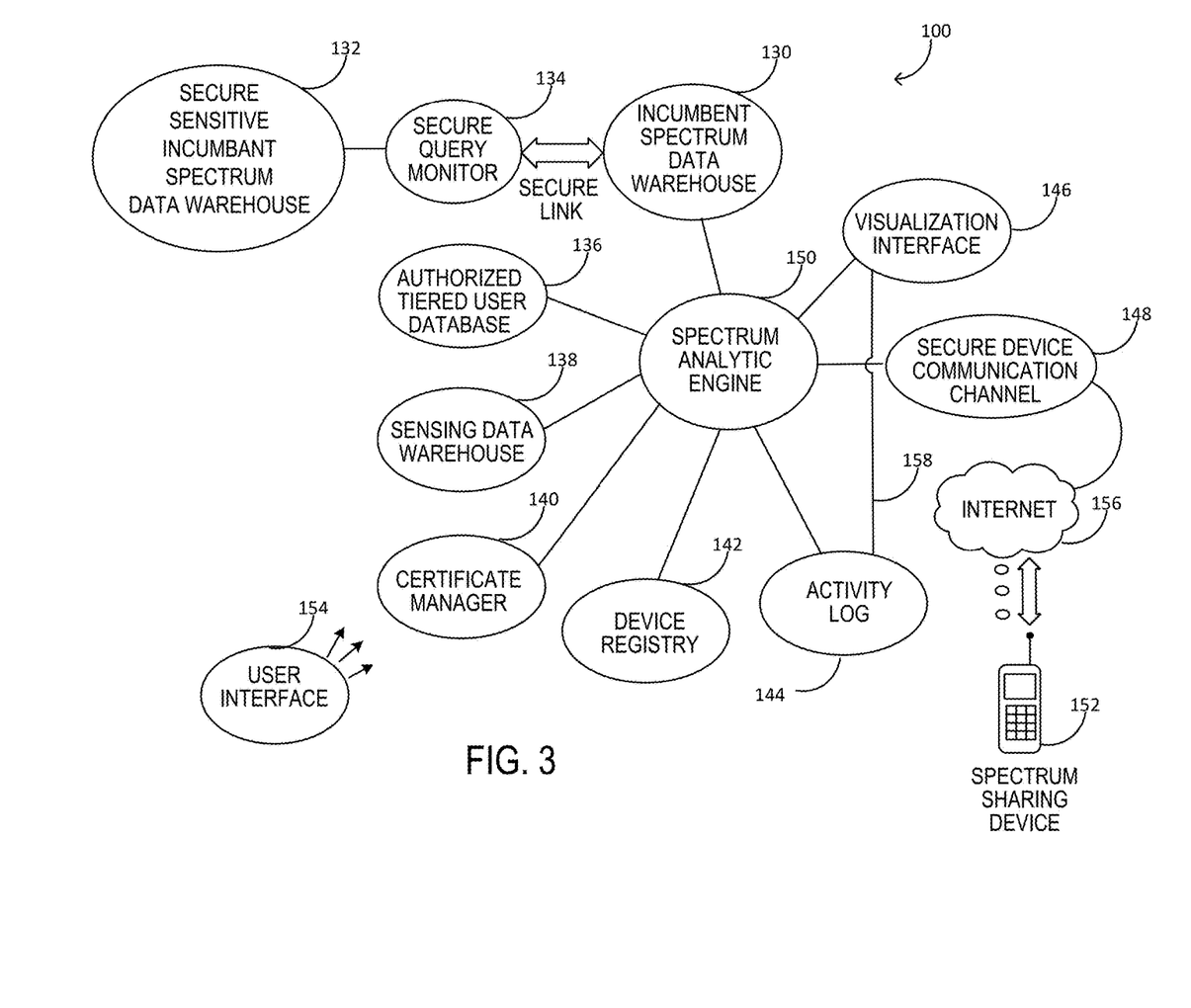
FIG. 3 is a diagram of components of a spectrum access manager.

FIG. 3 is a diagram showing an example of various components of the spectrum access system 100. An incumbent spectrum user data warehouse 130 is provided. This is where the information regarding incumbent users' (e.g., government agencies') spectrum usage is stored. This includes frequency bands, locations of operation, time windows of operation if applicable, power levels, antenna heights and antenna type where appropriate. Note that some of the uses may be systems such as radar, for which antenna height may not be a relevant parameter. The data warehouse 130 stores upper and lower bounds on what acceptable time-to-live values are for shared users. Information in this database can be updated often, for example, spectrum used by ships can be updated when ships approach or leave ports.

A secure sensitive incumbent spectrum data warehouse 132 is provided. This is similar to the data warehouse 130, except for storing sensitive spectrum use information, for example, Department of Defense spectrum use information, or spectrum use information for FBI surveillance.

A secure query monitor 134 monitors and possibly restricts queries to the sensitive data warehouse 132. The secure query monitor 134 is design to protect against information mining of the sensitive information. For example, the monitor 134 may block sequences of queries designed to gather all the database information in a short period of time.

An authorized tiered user database 136 stores the lists of identities of users authorized for certain tiers of usage. For example, a company may pay to have the tier 1 rights, which gives the company priority access over everyone else except the incumbent.

A sensing data warehouse 138 collects and stores sensing data, from devices and independent sensors. Entries are tagged with location and time, and stored so that operations can be performed looking at past spectrum usage in order to predict future potential usage windows and interference.

A certificate manager 140 authenticates devices and issues certificates to devices to use certain spectrum in certain areas over a certain time period.

A device registry 142 stores certifications of shared spectrum devices. The certifications may be self-certificates issued by the manufacturer of the devices that describe basic device capabilities. The registry 142 also contains information on flaws that have been detected in order to deny operation to flawed devices until remedied.

An activity log 144 lists all spectrum certificates issued.

A visualization interface 146 allows a visual interface to spectrum usage at any time, current or a snapshot of the past (hence the connection 158 to the activity log 144).

A secure device communication channel 148 establishes a secure link between a device (e.g., 152) making a request and a spectrum analytic engine (e.g., 150).

A spectrum analytic engine 150 is the brains, accesses all of the information stored and executes the algorithms to make spectrum allocation decisions. For example, upon receiving a request from a device to access a segment of spectrum, the spectrum analytic engine 150 determines whether the request is from a second tier user (e.g., priority access user) or a third their user (e.g., generally authorized access user). If the request is from a second tier user and the request does not interfere with the first tier users (e.g., incumbent users), the request is granted. If the request is from a third tier user and the request does not interfere with first tier users and authorized second tier users, the request is granted.

Note that in this description, when we say that the request from the second tier user does not interfere with the first tier users, we mean that if the request is granted and the second tier user uses the segment of spectrum as requested, it will likely not cause unacceptable interference with the first tier users. In most cases second tier users will be granted access at times or in places where the first tier incumbent users are not operating. When the second tier user uses the same spectrum as that used by the first tier users at the same time, there will likely be some interference, but as long as the interference is negligible or acceptable to the first tier users, the request can be granted (assuming other necessary criteria are also satisfied).

Similarly, when we say that the request from the third tier user does not interfere with the first tier users and authorized second tier users, we mean that if the request is granted and the third tier user uses the segment of spectrum as requested, it will likely not cause unacceptable interference with the first tier users or authorized second tier users. When the third tier user uses the same spectrum as that used by the first tier users and authorized second tier users at the same time, there will likely be some interference, but as long as the interference is negligible or acceptable to the first tier users and authorized second tier users, the request can be granted (assuming other necessary criteria are also satisfied).

Spectrum sharing devices 152 sends requests to the spectrum analytic engine 150 to request access to spectrum, and uses the spectrum according to limits specified by the certificates issued by the certificate manager 140. There can be many devices 152 sharing the spectrum. The figure shows only one representative device. The devices 152 may connect to the secure device communication channel 148 through the Internet 156.

A user interface 154 connects to all components to allow a user to configure the components and obtain status of the components. The user interface 154 can be run remotely.

In some implementations, the spectrum access manager 102 may include the incumbent spectrum user data warehouse 130, the authorized tiered user database 136, the sensing data warehouse 138, the certificate manager 140, the device registry 142, the activity log 144, and the visualization interface 146.

Figure 4:
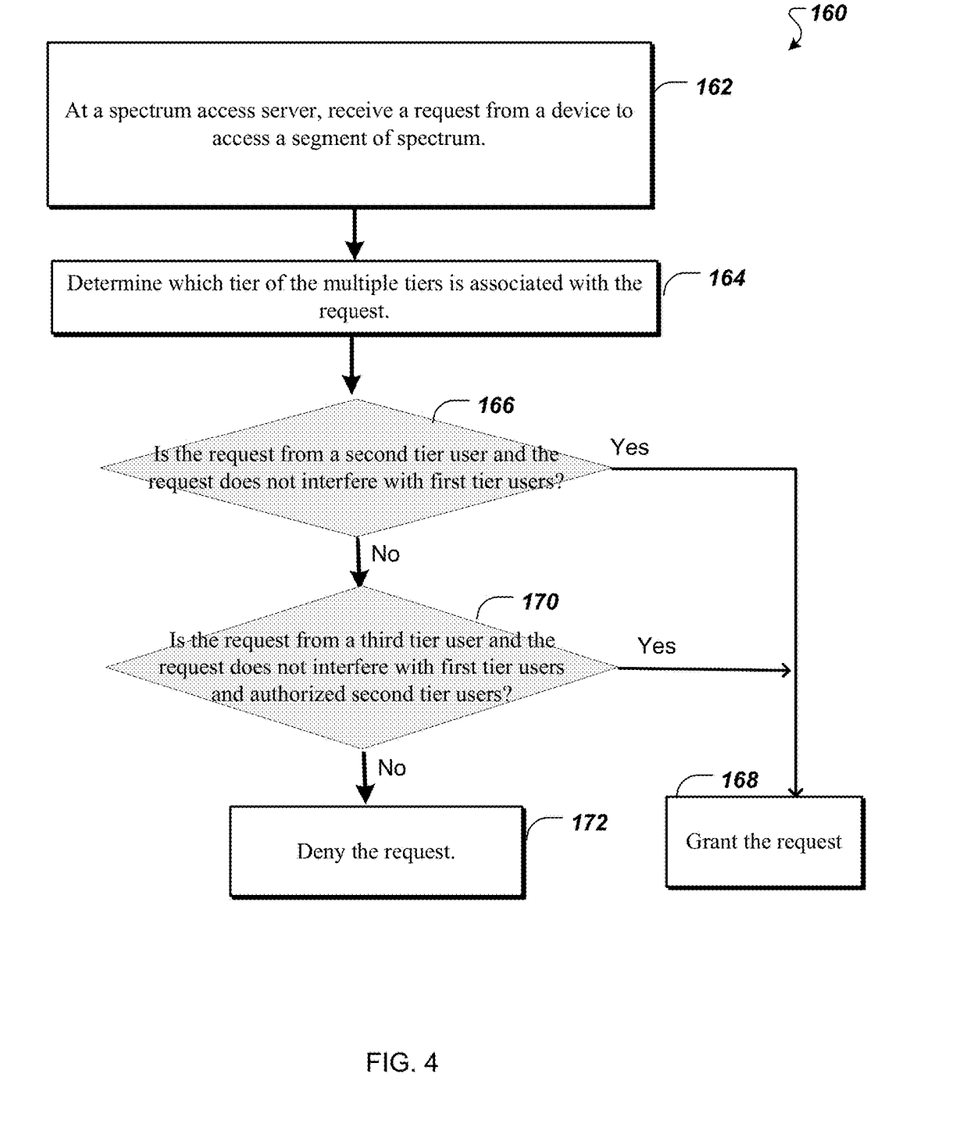
FIG. 4 is a flow diagram of a process for dynamically managing spectrum access and supporting multiple tiers of users.

Referring to FIG. 4, a process 160 for dynamically managing spectrum access and supporting multiple tiers of users is provided. The process 160 includes: at a spectrum access server, receiving a request from a device to access a segment of spectrum (162) and determining which tier of the multiple tiers is associated with the request (164). For example, the spectrum access server can be the spectrum access manager 102 of FIG. 1. The device can be one of the devices 110 or 112a-112c of FIG. 1.

If the request is from a second tier user and the request does not interfere with first tier users (166), the request is granted (168). If the request is from a third tier user and the request does not interfere with first tier users and authorized second tier users (170), the request is granted (168). If the request interferes with the first tier users or authorized second tier users, the request is denied (172). For example, the first tier users can include incumbent users, the second tier users can include priority access users, and the third tier users can include generally authorized access users.

The spectrum access manager 102 can include one or more processors and one or more computer-readable mediums (e.g., RAM, ROM, SDRAM, hard disk, optical disk, and flash memory). The one or more processors can perform various operations described above. The operations can also be implemented using application-specific integrated circuits (ASICs). The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire and fiber optics.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention. For example, the spectrum access manager 102 may include a billing module that supports a mechanism in which users can pay for access, and the fees may vary according to tier level. The spectrum access system 100 may support more than three tiers of users. There can be multiple spectrum access systems, and the operators of the spectrum access systems may coordinate to share basic spectrum usage information. There may be a synchronization interface to enable one spectrum access system to synchronize with other spectrum access systems. The synchronization interface may connect to the analytics engine and the certificate manager. Every time a certificate is issued, the synchronization interface uses a verification process (similar to that used in a multi-user database) to make sure that the other spectrum access systems do not issue conflicting certificates at the same time.

Accordingly, other embodiments are within the scope of the following claims.

What is claimed is:

1. A method for dynamically managing spectrum access in an environment in which both geographic area licenses and license-by-rule approaches are employed, the method comprising:
   at a spectrum access server, assigning an initial power level for each of a plurality of generally authorized access devices, in which the initial power level is a low power level associated with an indoor environment;
   at the spectrum access server, for each of the generally authorized access devices, increasing the power level assigned to the generally authorized access device upon determining that the generally authorized access device is in an area in which few other communication devices are using a spectrum common to that used by the generally authorized access device; and
   at the spectrum access server, for each of the generally authorized access devices, dynamically adjusting the power level of the generally authorized access device based on sensing data provided by one or more priority access devices in the area, including at least one of (i) sending a message to the generally authorized access device to adjust the power level of the generally authorized access device, or (ii) upon receiving a request from the generally authorized access device for a new certificate, adjusting the power level of the generally authorized access device when issuing the new certificate to the generally authorized access device.

2. The method of claim 1, comprising if the request from the generally authorized access device is likely to cause interference with the priority access devices, denying the request or replying with a modified grant that differs from the original request and is compatible with spectrum usage by the priority access devices.

3. The method of claim 1, comprising if the request from the generally authorized access device is likely to cause interference with the priority access devices, denying the request.

4. The method of claim 1, comprising
   determining a number of generally authorized access devices in the area in which the generally authorized access device that sent the request is located,
   determining whether aggregate interference from the generally authorized access devices in the area is likely to cause interference that may interfere with the one or more priority access devices, and
   denying the request if the aggregate interference is likely to cause interference that may interfere with the one or more priority access devices.

5. The method of claim 1 in which the certificate specifies a time limitation for which the generally authorized access device is authorized to use a segment of spectrum.

6. The method of claim 5 in which the certificate specifies a location limitation in which the generally authorized access device is authorized to use the segment of spectrum.

7. The method of claim 5, comprising before the time limitation expires, receiving a second request from the device to renew access to the segment of spectrum, and determining whether to grant the second request based on spectrum usage information that is collected after the first request is granted.

8. The method of claim 1 in which the one or more priority access devices comprise one or more devices in at least one of a cellular network or a wireless network that is based on at least one of IEEE 802.11 standards, and the sensing data provided by the one or more priority access devices comprise real time spectrum usage information from the one or more devices in at least one of a cellular network or a wireless network that is based on at least one of IEEE 802.11 standards.

9. The method of claim 1 in which the one or more priority access devices comprise one or more cellular phones that provide measurement reports, and the sensing data provided by the one or more priority access devices comprise real time spectrum usage information from the one or more cellular phones.

10. The method of claim 9 in which the measurement reports include information about strengths of cell towers within ranges of the phones.

11. The method of claim 1 in which the one or more priority access devices comprise at least one of a femtocell device or a wireless access point that is based on at least one of IEEE 802.11 standards, and the sensing data provided by the one or more priority access devices comprise real time spectrum usage information from the at least one of a femtocell device or a wireless access point that is based on at least one of IEEE 802.11 standards.

12. The method of claim 1 in which the one or more priority access devices sense the spectrum from time to time and report to the spectrum access server.

13. The method of claim 1 in which assigning an initial power level for each of a plurality of generally authorized access devices comprises assigning at least two different initial power levels for at least two different generally authorized access devices based on a license-by-rule approach.

14. The method of claim 1, including assigning an initial power level to a generally authorized access device based on whether a type of environment that the generally authorized access device is located at.

15. The method of claim 14, including assigning a first initial power level to a generally authorized access device if the device is used indoor in an apartment building, and assigning a second initial power level to the generally authorized access device if the device is used in a corporate campus, in which the second initial power level is different from the first initial power level.

16. The method of claim 15, including assigning a third initial power level to the generally authorized access device if the device is used in a rural area, in which the third initial power level is different from the first initial power level and the second initial power level.

17. The method of claim 1 in which the spectrum access server determines a time value of a time-to-live parameter assigned to the generally authorized access device based at least in part on a timeframe for an adjustment to a power level of the generally authorized access device.

18. The method of claim 17 in which when the generally authorized access device requests a new certificate, the spectrum access server increases a time-to-live value for the device if the power level assigned to the device remains the same when the new certificate is issued.

19. A system for dynamically managing spectrum access in an environment in which both geographic area licenses and license-by-rule approaches are employed, the system comprising:
   a first database storing information on initial power levels for generally authorized access devices;

and
a spectrum analytic engine to make dynamic spectrum allocation decisions based on the information in the first database and real time spectrum usage information collected from priority access devices, in which the spectrum analytic engine is configured to,
assign an initial power level for each of a plurality of generally authorized access devices, in which the initial power level is a low power level associated with an indoor environment;
for each of the generally authorized access devices, increase the power level assigned to the generally authorized access device upon determining that the generally authorized access device is in an area in which few other communication devices are using a spectrum common to that used by the generally authorized access device; and
for each of the generally authorized access devices, dynamically adjust the power level of the generally authorized access device based on sensing data provided by one or more priority access devices in the area, including at least one of (i) send a message to the generally authorized access device to adjust the power level of the generally authorized access device, or (ii) upon receiving a request from the generally authorized access device for a new certificate, adjust the power level of the generally authorized access device when issuing the new certificate to the generally authorized access device.

20. The system of claim 19 in which the first database also stores information on at least one of frequency band, location of operation, time window of operation, antenna height, or antenna type of one or more priority access users.

21. The system of claim 19, comprising a second database having information on identities of users authorized to request access to the segment of spectrum.

22. The system of claim 19, comprising a certificate manager that issues certificates to one or more generally authorized access devices to use the segment of spectrum in certain areas over certain time periods.

* * * * *